(12) United States Patent
Chen (10) Patent No.: US 7,695,073 B1
(45) Date of Patent: Apr. 13, 2010

(54) BICYCLE REAR HUB THAT IS ESPECIALLY AVAILABLE FOR ACROBATICS

(75) Inventor: Ching-Shu Chen, Changhua (TW)

(73) Assignee: Chosen Co., Ltd., Shanghua Hsien (TW)

( * ) Notice: Subject to any disclaimer, the term of this patent is extended or adjusted under 35 U.S.C. 154(b) by 147 days.

(21) Appl. No.: 11/946,916

(22) Filed: Nov. 29, 2007

(51) Int. Cl.
*B62L 1/00* (2006.01)
*B62D 27/06* (2006.01)

(52) U.S. Cl. .................. 301/110.5; 301/6.8; 188/24.11; 188/26

(58) Field of Classification Search ............ 301/6.8, 301/110.5; 192/46, 64; 188/26, 24.11, 24.17, 188/218 XL
See application file for complete search history.

(56) References Cited

U.S. PATENT DOCUMENTS

| | | | | |
|---|---|---|---|---|
| 952,041 | A * | 3/1910 | Hancock | 192/217.3 |
| 4,593,799 | A * | 6/1986 | Ozaki | 192/46 |
| 6,880,897 | B2 * | 4/2005 | Goss et al. | 301/6.9 |
| 7,044,272 | B2 * | 5/2006 | Takizawa | 188/26 |
| 7,216,743 | B2 * | 5/2007 | Takizawa et al. | 188/26 |
| 7,367,632 | B2 * | 5/2008 | Chang | 301/6.8 |
| 7,437,812 | B2 * | 10/2008 | Baird | 29/401.1 |
| 7,445,296 | B1 * | 11/2008 | Chen | 301/110.5 |

* cited by examiner

*Primary Examiner*—S. Joseph Morano
*Assistant Examiner*—Kip T Kotter
(74) *Attorney, Agent, or Firm*—Alan Kamrath; Kamrath & Associates PA (57) ABSTRACT

A rear hub for a bicycle includes a shaft, a hub body mounted on the shaft and provided with two spoke mounting portions and a mounting ring, a driven member located beside the mounting ring, a brake disc mounted on the mounting ring, and a drive member engaged with the driven member. Thus, the drive member and the brake disc are located at the same side of the hub body, so that one side of the hub body is provided with the drive member and the brake disc, and the other side of the hub body is disposed at a vacant state to facilitate a rider using the other side of the hub body to have a greater inclined angle without being obstructed by the drive member and the brake disc so as to perform acrobatics easily and smoothly.

6 Claims, 11 Drawing Sheets

BICYCLE REAR HUB THAT IS ESPECIALLY AVAILABLE FOR ACROBATICS

BACKGROUND OF THE INVENTION

1. Field of the Invention

The present invention relates to a hub and, more particularly, to a rear hub for a bicycle.

2. Description of the Related Art

Figure 9:
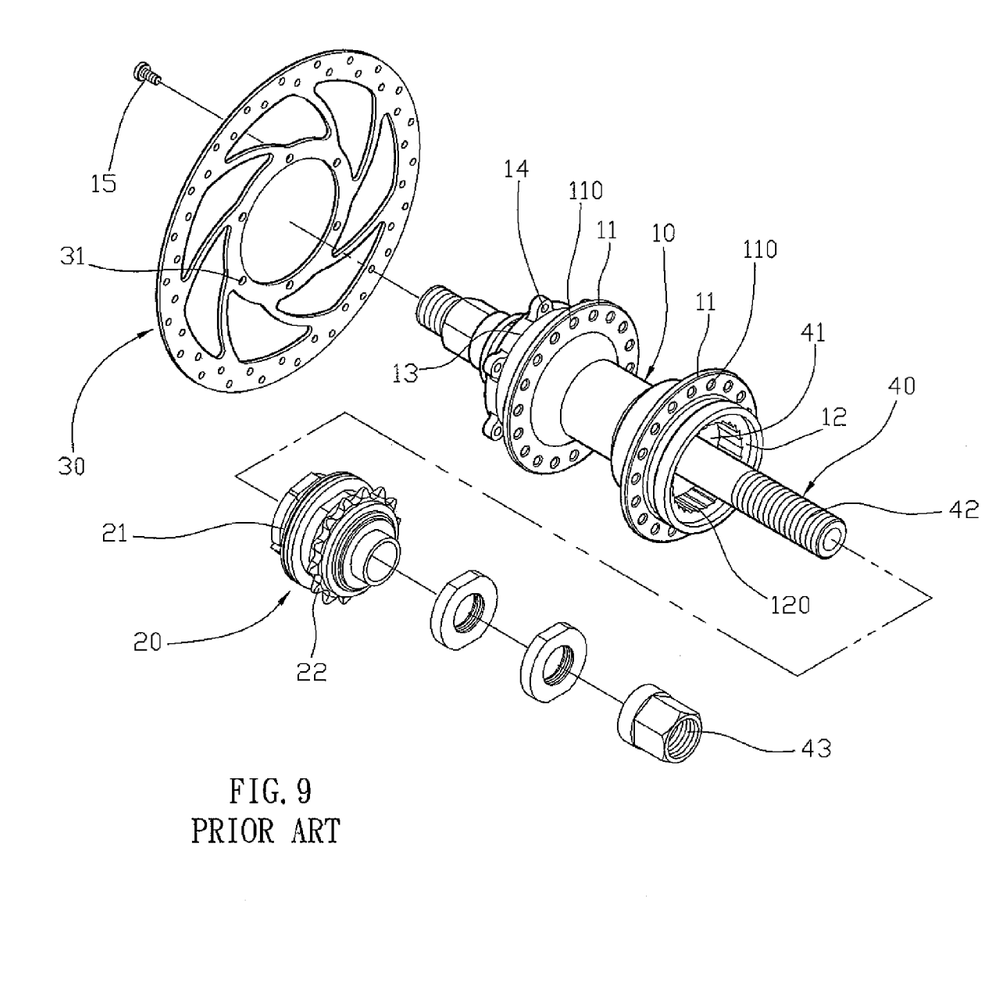
FIG. 9 is an exploded perspective view of a conventional rear hub in accordance with the prior art.
Figure 10:
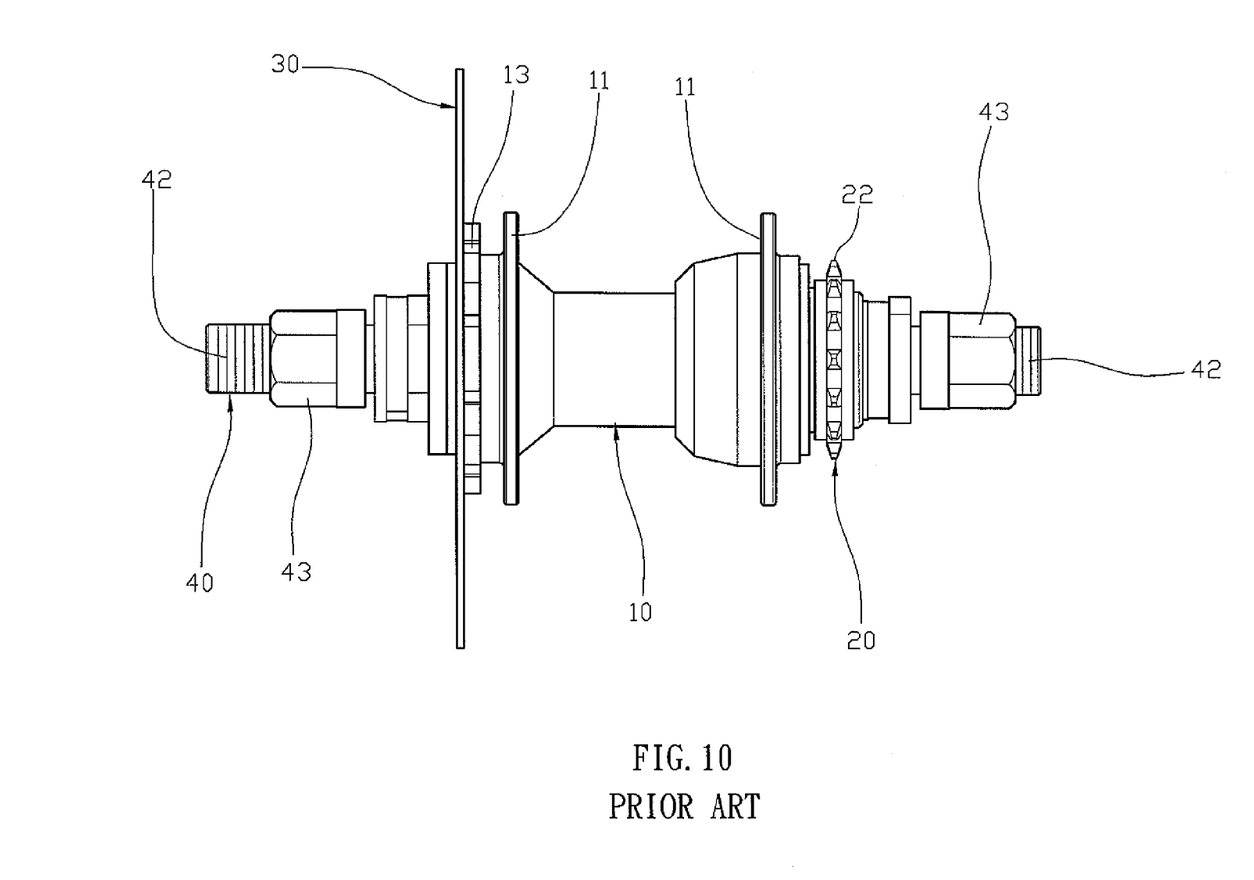
FIG. 10 is a front cross-sectional assembly view of the conventional rear hub as shown in FIG. 9.
Figure 11:
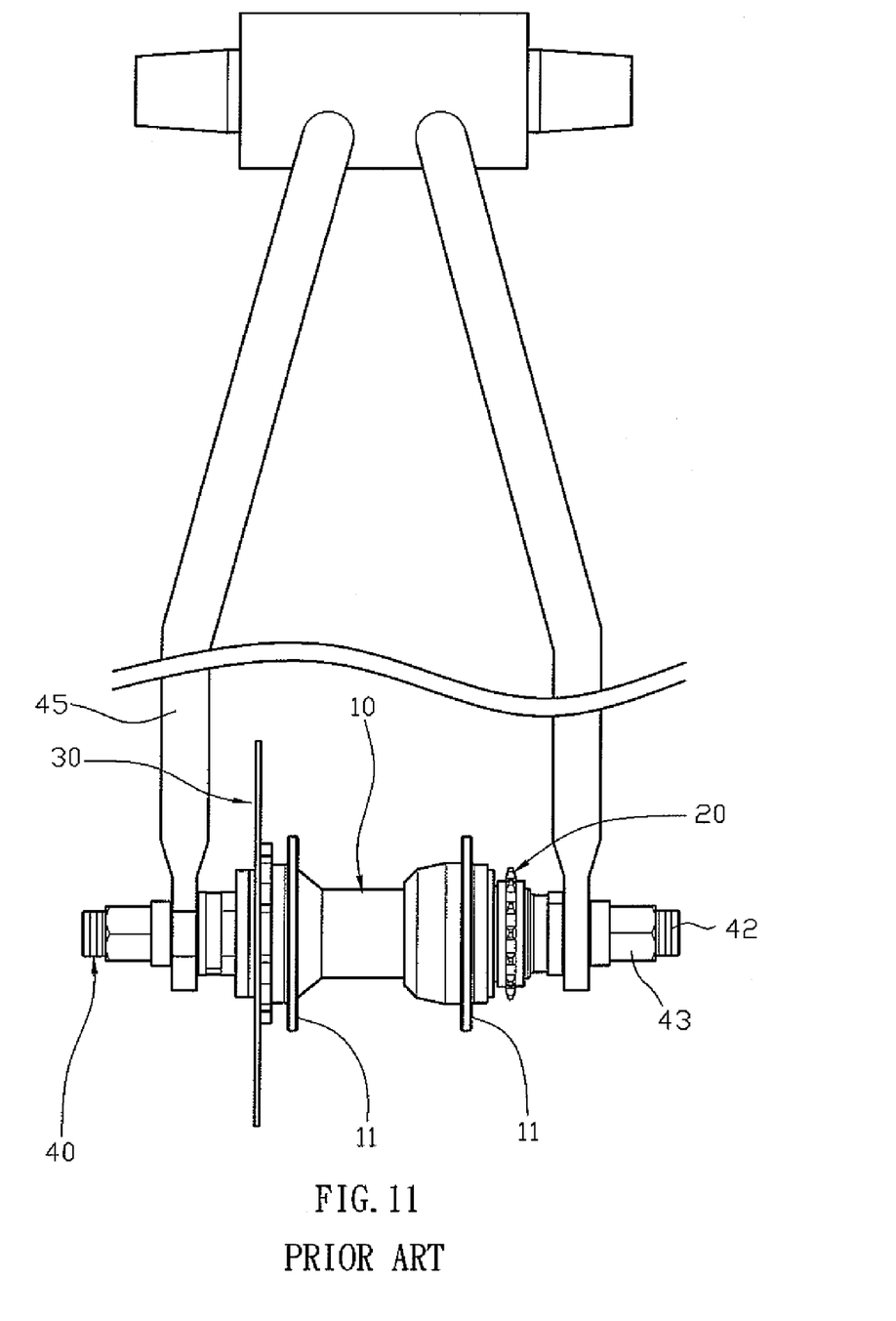
FIG. 11 is a front cross-sectional assembly view of the conventional rear hub for a bicycle as shown in FIG. 9.

A conventional rear hub for a bicycle in accordance with the prior art shown in FIGS. 9-11 comprises a shaft 40, a hub body 10 rotatably mounted on the shaft 40 by a plurality of bearings 41 and provided with two protruding spoke mounting portions 11, a mounting ring 13 mounted on a first side of the hub body 10 and located beside one of the two spoke mounting portions 11, a driven member 12 mounted on a second side of the hub body 10 to drive and rotate the hub body 10 and located beside the other one of the two spoke mounting portions 11, a brake disc 30 mounted on the mounting ring 13 of the hub body 10, and a drive member 20 rotatably mounted on the shaft 40 and engaged with the driven member 12 to drive and rotate the driven member 12.

The shaft 40 has two opposite ends each provided with a threaded portion 42 for screwing a locking nut 43. Each of the two spoke mounting portions 11 of the hub body 10 has a periphery provided with a plurality of fixing holes 110 for fixing a plurality of spokes (not shown) of a rear wheel (not shown). The brake disc 30 is used for clamping a brake (not shown) to produce a speed reduction function. The mounting ring 13 of the hub body 10 has a periphery provided with a plurality of screw bores 14, the brake disc 30 is provided with a plurality of through holes 31, and the hub further comprises a plurality of locking screws 15 each extending through a respective one of the through holes 31 of the brake disc 30 and each screwed into a respective one of the screw bores 14 of the mounting ring 13. The driven member 12 has an inner wall provided with a plurality of oneway ratchet teeth 120. The drive member 20 has a first end provided with a oneway ratchet wheel 21 meshing with the oneway ratchet teeth 120 of the driven member 12 and a second end provided with a freewheel 22. Thus, the drive member 20 is rotatable to drive and rotate the driven member 12 in a oneway direction by engagement between the oneway ratchet wheel 21 and the oneway ratchet teeth 120 of the driven member 12 so as to drive and rotate the hub body 10 in a oneway direction.

As shown in FIG. 11, when the shaft 40 is mounted on a rear frame 45 of the bicycle, the locking nut 43 is rotated on the respective threaded portion 42 of the shaft 40 to press the rear frame 45 onto the hub body 10 so as to attach the hub body 10 to the rear frame 45.

In assembly, the hub body 10 is connected to a rear wheel (not shown) of the bicycle, the shaft 40 is connected to the rear frame 45 of the bicycle, the freewheel 22 of the drive member 20 is driven by a chain (not shown) which is driven by a chainwheel (not shown) which is driven by a pedal (not shown) that is pedalled by a rider.

In operation, when the freewheel 22 of the drive member 20 is rotated, the drive member 20 is rotatable to drive and rotate the driven member 12 in a oneway direction by engagement between the oneway ratchet wheel 21 of the drive member 20 and the oneway ratchet teeth 120 of the driven member 12 to drive and rotate the hub body 10 in a oneway direction so as to drive and rotate the rear wheel in a oneway direction.

Thus, when the bicycle is used in an acrobatic place, the rear wheel is often inclined to be very close to the ground for performance of acrobatics. However, the drive member 20 and the brake disc 30 are located at the two opposite sides of the hub body 10 and have a projecting shape so that when the rear wheel is inclined to have a determined inclined angle, the drive member 20 or the brake disc 30 easily contacts raised equipments in the acrobatic place or even rubs the ground, thereby interfering with movement of the bicycle, and thereby easily wearing the drive member 20 or the brake disc 30.

BRIEF SUMMARY OF THE INVENTION

In accordance with the present invention, there is provided a hub, comprising a shaft, a hub body rotatably mounted on the shaft and provided with two protruding spoke mounting portions and a mounting ring located beside one of the two spoke mounting portions, a driven member mounted on the hub body to drive and rotate the hub body and located beside the mounting ring, a brake disc mounted on the mounting ring of the hub body, and a drive member rotatably mounted on the shaft and engaged with the driven member to drive and rotate the driven member.

The primary objective of the present invention is to provide a bicycle rear hub that is especially available for acrobatics.

Another objective of the present invention is to provide a rear hub for a bicycle, wherein the drive member and the brake disc are located beside the one of the two spoke mounting portions of the hub body and are spaced from the other one of the two spoke mounting portions of the hub body so that the drive member and the brake disc are located at the same side of the hub body.

A further objective of the present invention is to provide a rear hub for a bicycle, wherein the drive member and the brake disc are located at the same side of the hub body, so that one side of the hub body is provided with the drive member and the brake disc, and the other side of the hub body is disposed at a vacant state to facilitate a rider using the other side of the hub body to have a greater inclined angle without being obstructed by the drive member and the brake disc so as to perform acrobatics easily and smoothly.

Further benefits and advantages of the present invention will become apparent after a careful reading of the detailed description with appropriate reference to the accompanying drawings.

DETAILED DESCRIPTION OF THE INVENTION

Figure 1:
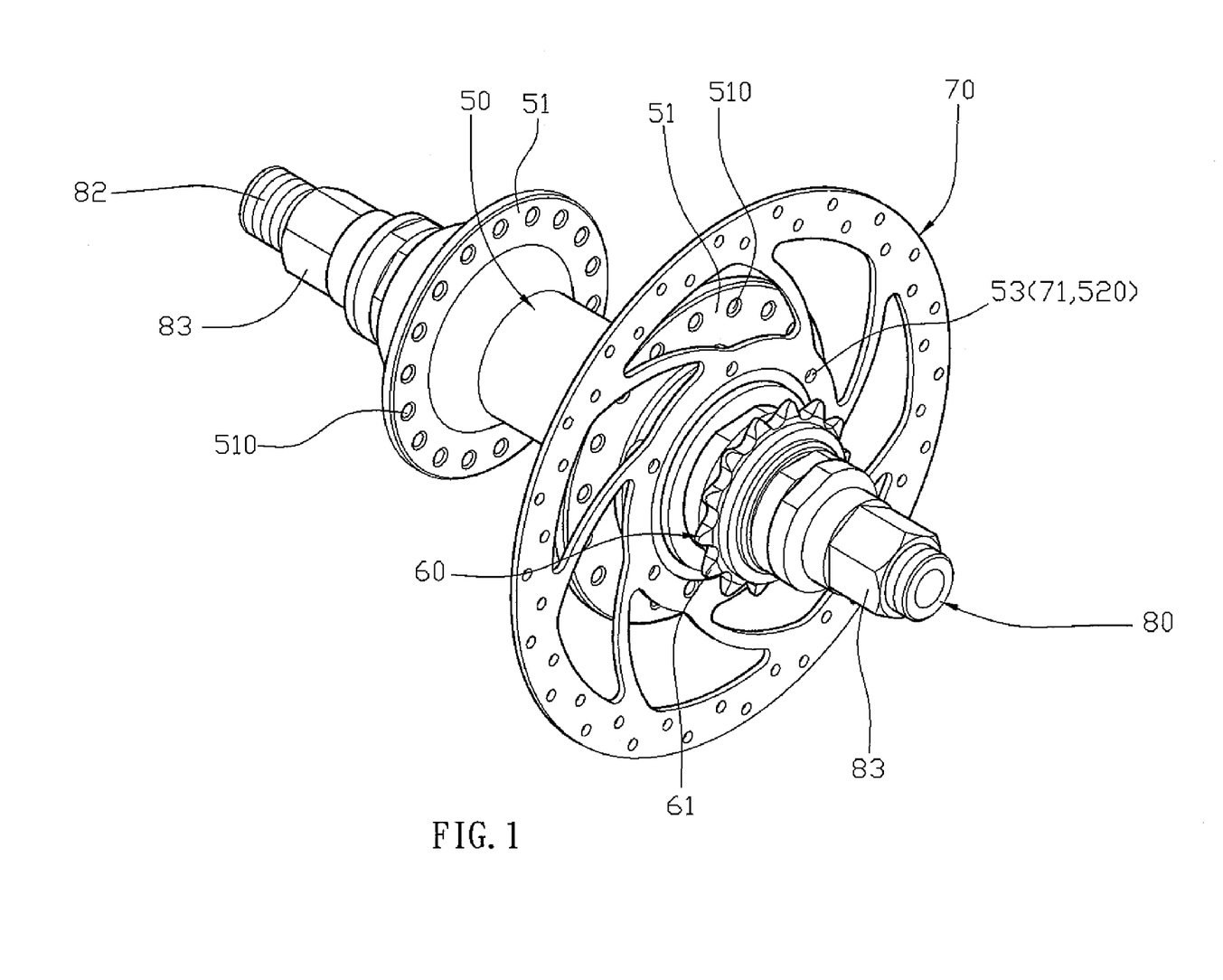
FIG. 1 is a perspective view of a rear hub in accordance with the preferred embodiment of the present invention.
Figure 2:
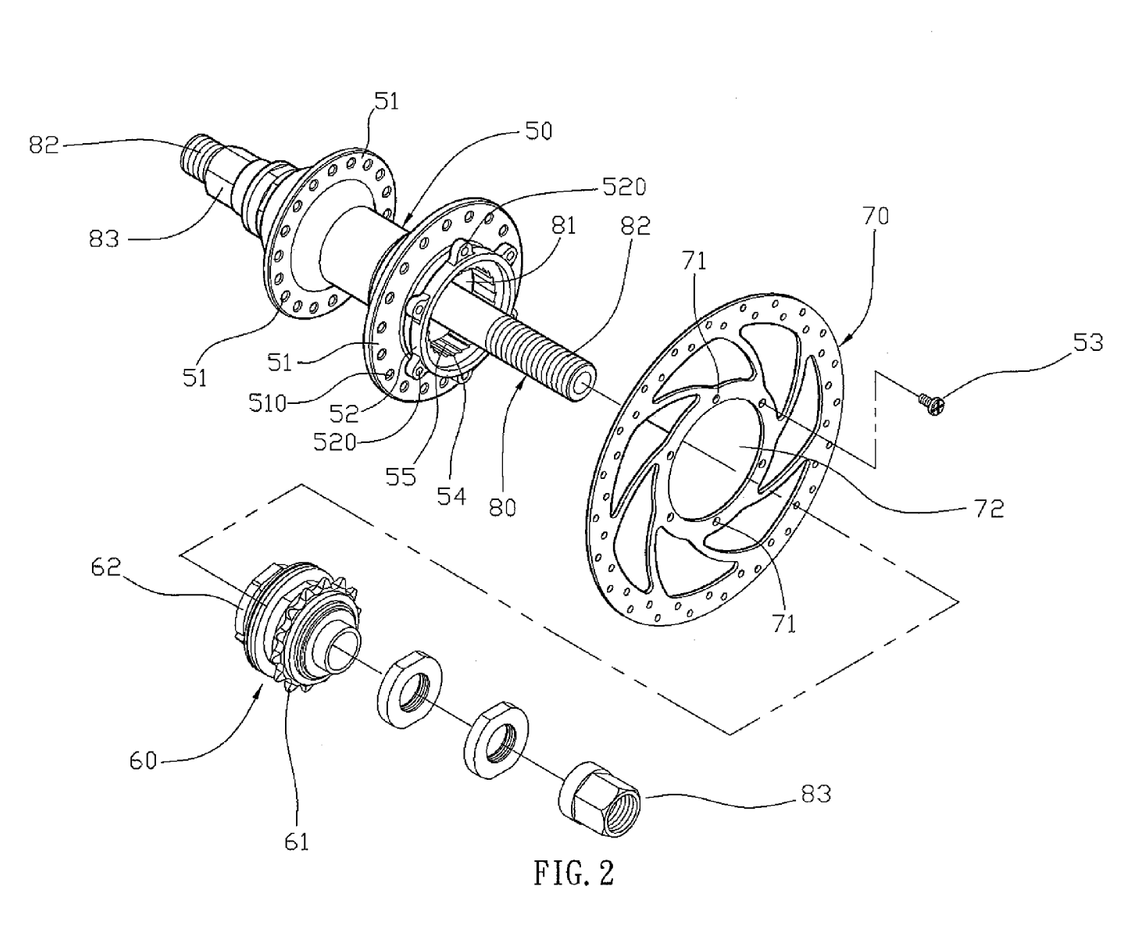
FIG. 2 is an exploded perspective view of the rear hub as shown in FIG. 1.
Figure 3:
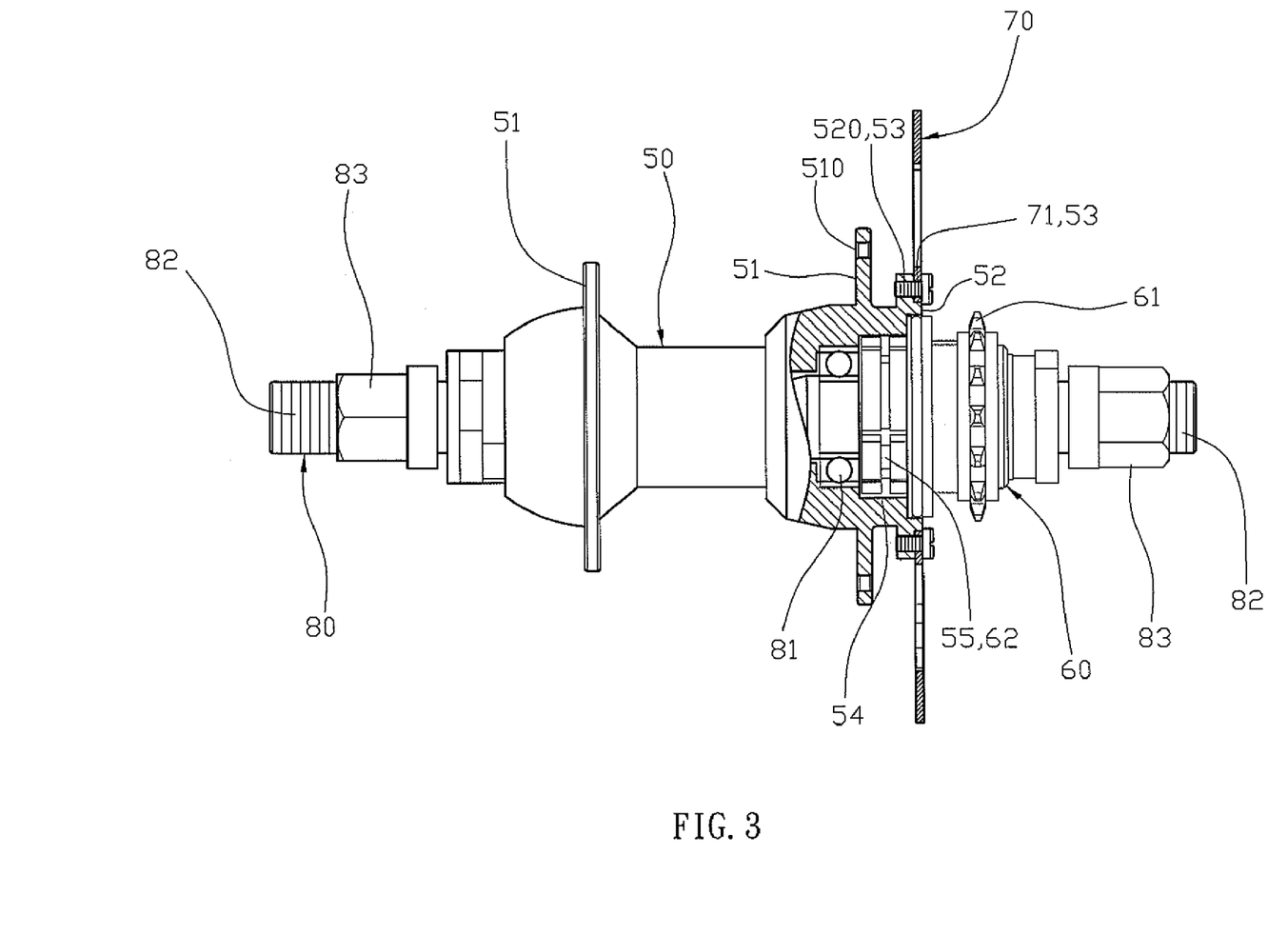
FIG. 3 is a front cross-sectional view of the rear hub as shown in FIG. 1.

Referring to the drawings and initially to FIGS. 1-3, a rear hub for a bicycle in accordance with the preferred embodiment of the present invention comprises a shaft 80, a hub body 50 rotatably mounted on the shaft 80 by a plurality of bearings 81 and provided with two protruding spoke mounting portions 51 and a mounting ring 52 located beside one of the two spoke mounting portions 51, a driven member 54 mounted on the hub body 50 to drive and rotate the hub body 50 and located beside the mounting ring 52, a brake disc 70 mounted on the mounting ring 52 of the hub body 50, and a drive member 60 rotatably mounted on the shaft 80 and engaged with the driven member 54 to drive and rotate the driven member 54.

In such a manner, the driven member 54 and the mounting ring 52 are located beside the one of the two spoke mounting portions 51 of the hub body 50 and are spaced from the other one of the two spoke mounting portions 51 of the hub body 50 so that the driven member 54 and the mounting ring 52 are located at the same side of the hub body 50. Thus, the drive member 60 and the brake disc 70 are located beside the one of the two spoke mounting portions 51 of the hub body 50 and are spaced from the other one of the two spoke mounting portions 51 of the hub body 50 so that the drive member 60 and the brake disc 70 are located at the same side of the hub body 50.

The shaft 80 has two opposite ends each provided with a threaded portion 82 for screwing a locking nut 83. Each of the two spoke mounting portions 51 of the hub body 50 has a periphery provided with a plurality of fixing holes 510 for fixing a plurality of spokes (not shown) of a rear wheel (not shown). The brake disc 70 has a central portion provided with a central hole 72, and the drive member 60 extends through and protrudes outwardly from the central hole 72 of the brake disc 70. The brake disc 70 is used for clamping a brake (not shown) to produce a speed reduction function.

The mounting ring 52 of the hub body 50 has a periphery provided with a plurality of screw bores 520, the central hole 72 of the brake disc 70 has a periphery provided with a plurality of through holes 71, and the hub further comprises a plurality of locking screws 53 each extending through a respective one of the through holes 71 of the brake disc 70 and each screwed into a respective one of the screw bores 520 of the mounting ring 52 of the hub body 50.

In the preferred embodiment of the present invention, the driven member 54 is an annular body mounted in the mounting ring 52 and located between the one of the two spoke mounting portions 51 of the hub body 50 and the brake disc 70. The driven member 54 has an inner wall provided with a plurality of oneway ratchet teeth 55. The drive member 60 has a first end provided with a oneway ratchet wheel 62 received in the driven member 54 and meshing with the oneway ratchet teeth 55 of the driven member 54 and a second end provided with a freewheel 61. The brake disc 70 is located between the oneway ratchet wheel 62 and the freewheel 61 of the drive member 60. Thus, the drive member 60 is rotatable to drive and rotate the driven member 54 in a oneway direction by engagement between the oneway ratchet wheel 62 and the oneway ratchet teeth 55 of the driven member 54 so as to drive and rotate the hub body 50 in a oneway direction.

Figure 4:
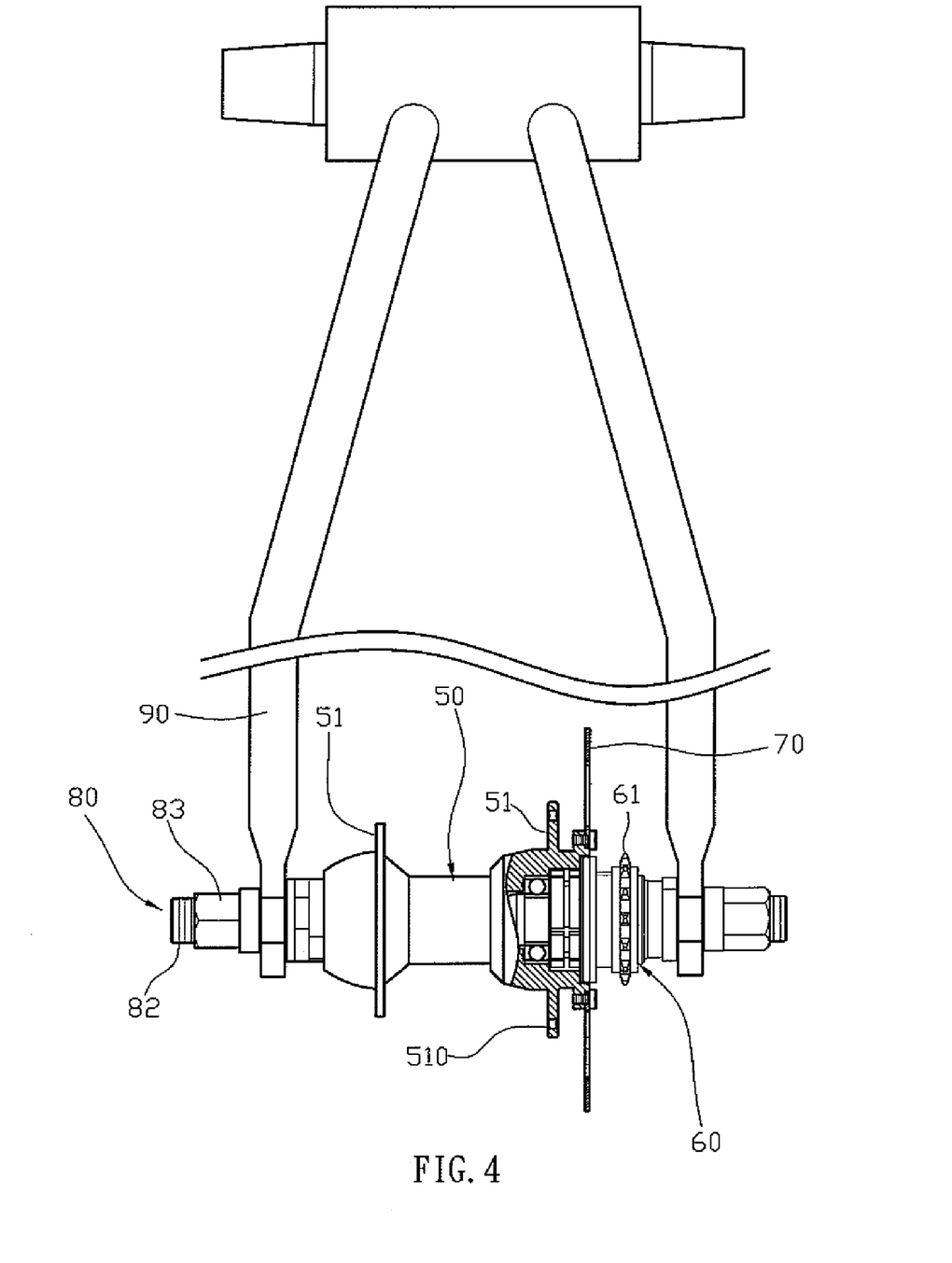
FIG. 4 is a front cross-sectional view of the rear hub for a bicycle as shown in FIG. 3.

As shown in FIG. 4, when the shaft 80 is mounted on a rear frame 90 of the bicycle, the locking nut 83 is rotated on the respective threaded portion 82 of the shaft 80 to press the rear frame 90 onto the hub body 50 so as to attach the hub body 50 to the rear frame 90.

In assembly, the hub body 50 is connected to a rear wheel (not shown) of the bicycle, the shaft 80 is connected to the rear frame 90 of the bicycle, the freewheel 61 of the drive member 60 is driven by a chain (not shown) which is driven by a chainwheel (not shown) which is driven by a pedal (not shown) that is pedalled by a rider.

In operation, when the freewheel 61 of the drive member 60 is rotated normally, the drive member 60 is rotatable to drive and rotate the driven member 54 in a oneway direction by engagement between the oneway ratchet wheel 62 of the drive member 60 and the oneway ratchet teeth 55 of the driven member 54 to drive and rotate the hub body 50 in a oneway direction so as to drive and rotate the rear wheel in a oneway direction.

Accordingly, the drive member 60 and the brake disc 70 are located beside the one of the two spoke mounting portions 51 of the hub body 50 and are spaced from the other one of the two spoke mounting portions 51 of the hub body 50 so that the drive member 60 and the brake disc 70 are located at the same side of the hub body 50. In addition, the drive member 60 and the brake disc 70 are located at the same side of the hub body 50, so that one side of the hub body 50 is provided with the drive member 60 and the brake disc 70, and the other side of the hub body 50 is disposed at a vacant state to facilitate a rider using the other side of the hub body 50 to have a greater inclined angle without being obstructed by the drive member 60 and the brake disc 70 so as to perform acrobatics easily and smoothly.

Figure 5:
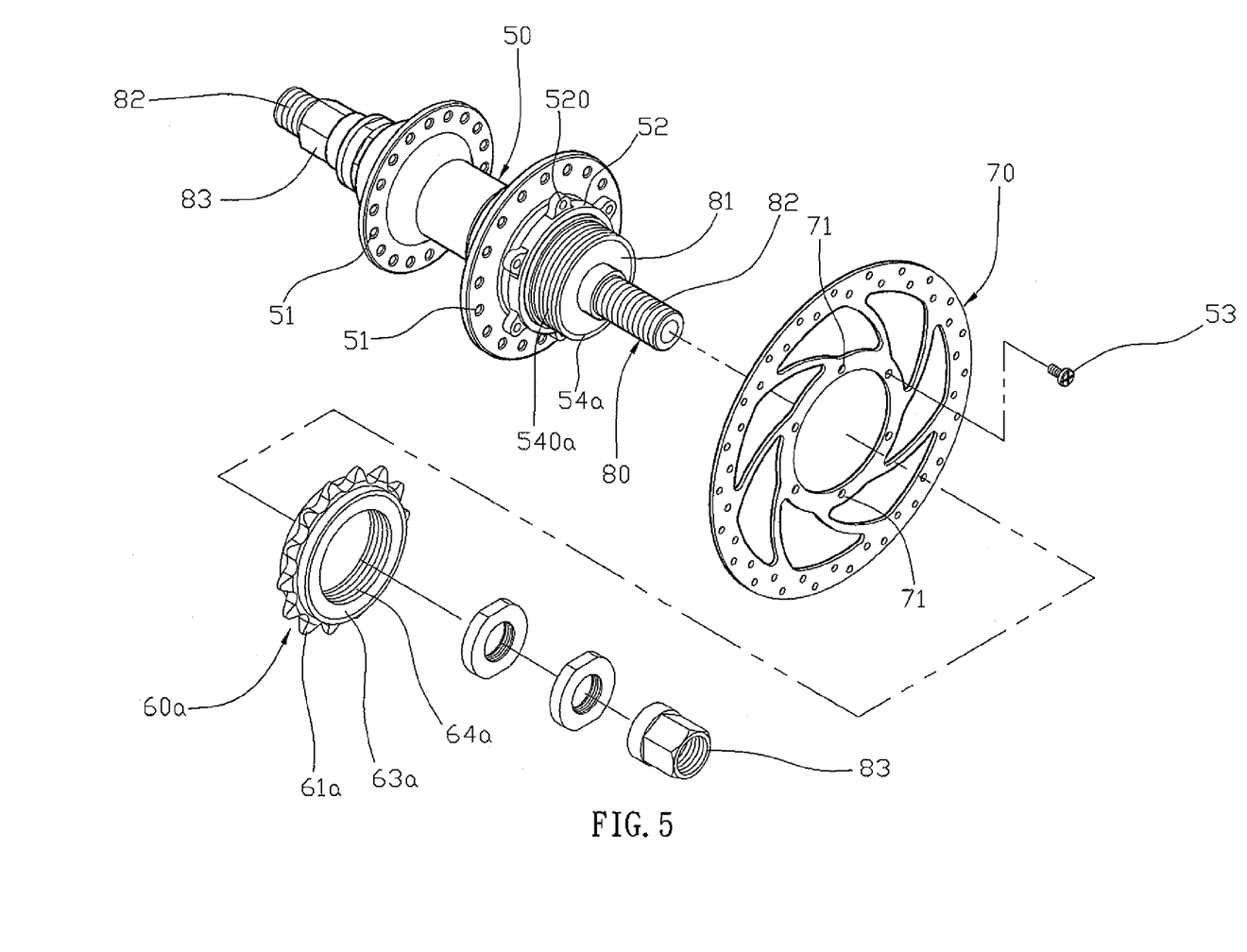
FIG. 5 is an exploded perspective view of a rear hub in accordance with another preferred embodiment of the present invention.
Figure 6:
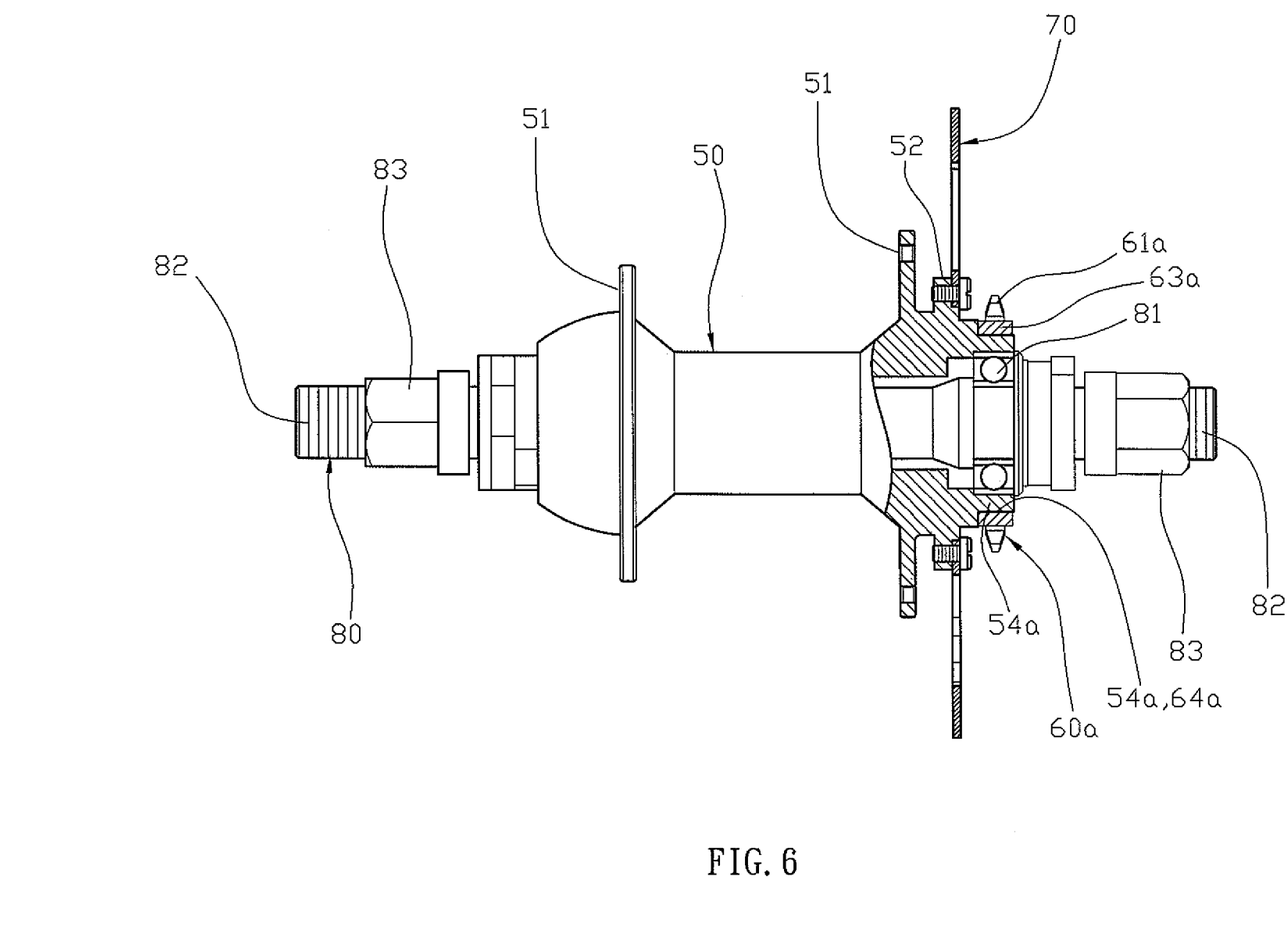
FIG. 6 is a front cross-sectional assembly view of the rear hub as shown in FIG. 5.

Referring to FIGS. 5 and 6, the driven member 54a is an annular protruding block protruding outwardly from the mounting ring 52, and the brake disc 70 is located between the mounting ring 52 and the driven member 54a. The driven member 54a has an outer wall provided with an outer threaded section 540a. The drive member 60a has an outer wall provided with a freewheel 61a and an inner wall provided with a rotatable oneway ratchet wheel 63a which has an inner wall provided with an inner threaded section 64a screwed onto the outer threaded section 540a of the driven member 54a. The oneway ratchet wheel 63a of the drive member 60a is located between the freewheel 61a and the driven member 54a. Thus, the drive member 60a is rotatable to drive and rotate the driven member 54a in a oneway direction by provision of the oneway ratchet wheel 63a so as to drive and rotate the hub body 50 in a oneway direction.

Figure 7:
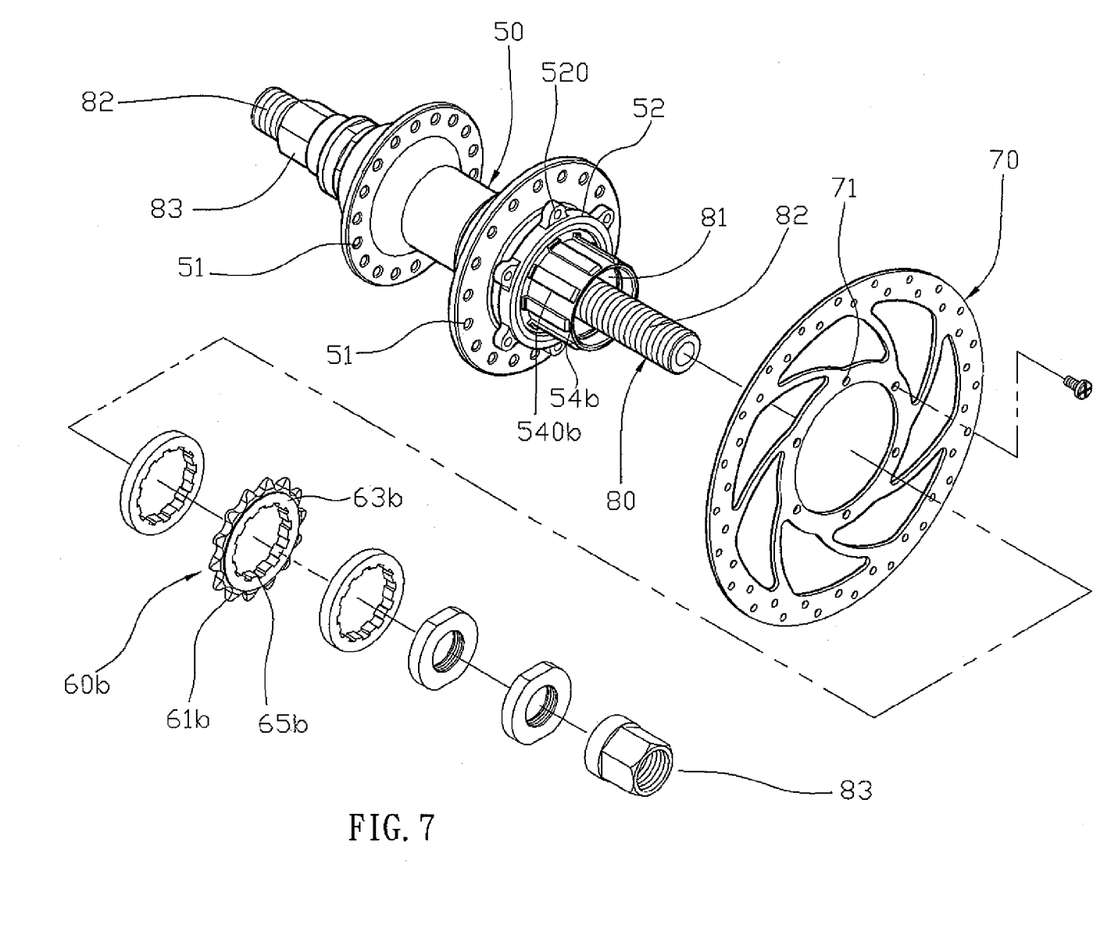
FIG. 7 is an exploded perspective view of a rear hub in accordance with another preferred embodiment of the present invention.
Figure 8:
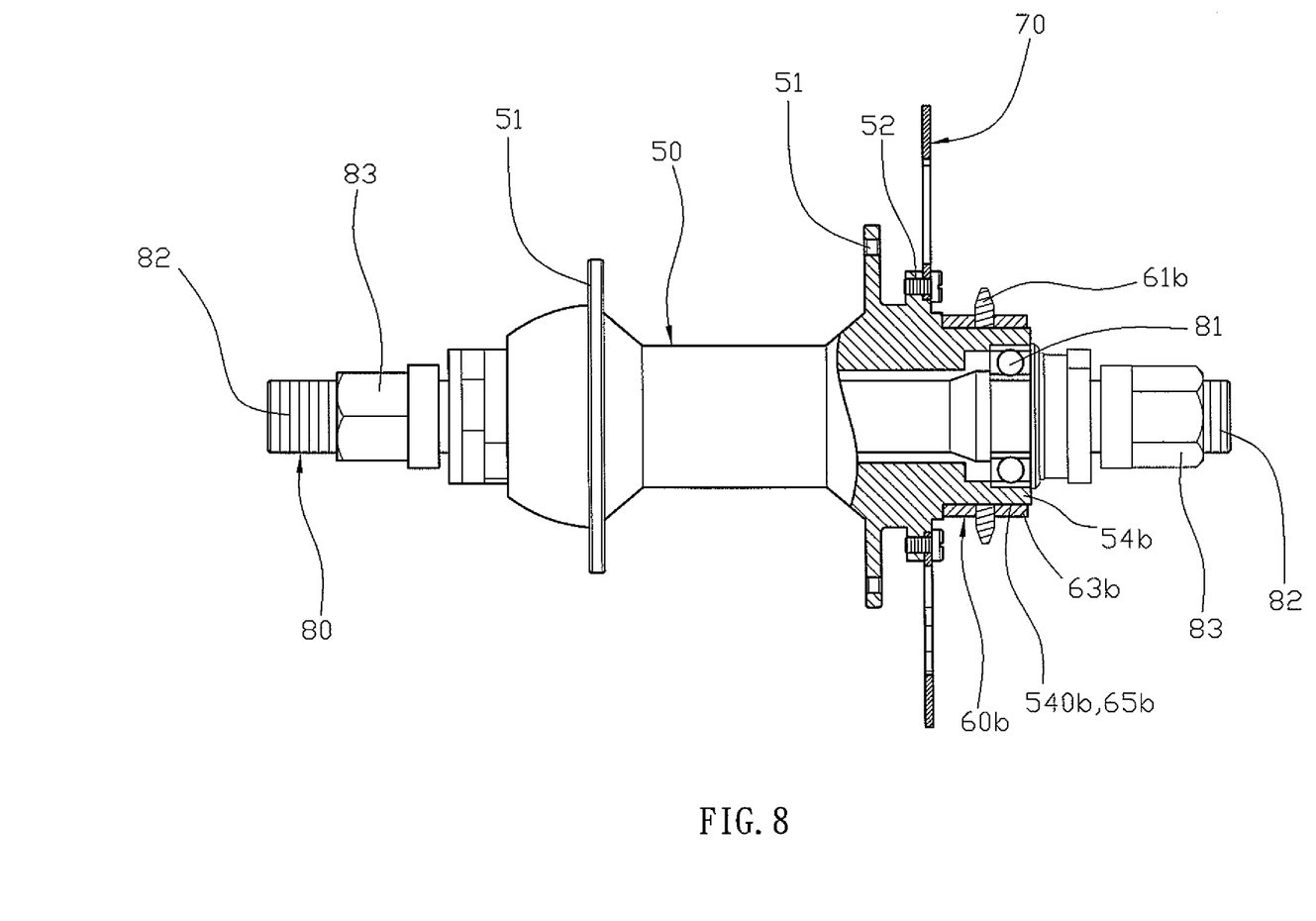
FIG. 8 is a front cross-sectional assembly view of the rear hub as shown in FIG. 7.

Referring to FIGS. 7 and 8, the driven member 54b is an annular protruding block protruding outwardly from the mounting ring 52, and the brake disc 70 is located between the mounting ring 52 and the driven member 54b. The driven member 54b has an outer wall provided with a plurality of elongate keys 540b. The drive member 60b has an outer wall provided with a freewheel 61b and an inner wall provided with a rotatable oneway ratchet wheel 63b which has an inner wall provided with a plurality of keyways 65b mounted on the keys 540b of the driven member 54b. The oneway ratchet wheel 63b of the drive member 60b is located between the freewheel 61b and the driven member 54b. Thus, the drive member 60b is rotatable to drive and rotate the driven member 54b in a oneway direction by provision of the oneway ratchet wheel 63b so as to drive and rotate the hub body 50 in a oneway direction.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hub assembly, comprising:

a shaft;

a hub body rotatably mounted on the shaft and provided with two protruding spoke mounting portions and a mounting ring located beside one of the two spoke mounting portions;

a driven member mounted on the hub body to drive and rotate the hub body and located beside the mounting ring;

a brake disc mounted on the mounting ring of the hub body;

a drive member rotatably mounted on the shaft and engaged with the driven member to drive and rotate the driven member;

wherein the driven member and the mounting ring are located beside the one of the two spoke mounting portions of the hub body and are spaced from the other one of the two spoke mounting portions of the hub body so that the driven member and the mounting ring are located at the same side of the hub body;

the drive member and the brake disc are located beside the one of the two spoke mounting portions of the hub body and are spaced from the other one of the two spoke mounting portions of the hub body so that the drive member and the brake disc are located at the same side of the hub body;

the brake disc has a central portion provided with a central hole;

the mounting ring of the hub body has a periphery provided with a plurality of screw bores;

the central hole of the brake disc has a periphery provided with a plurality of through holes;

the hub further comprises a plurality of locking screws each extending through a respective one of the through holes of the brake disc and each screwed into a respective one of the screw bores of the mounting ring of the hub body;

the driven member is an annular body mounted in the mounting ring and located between the one of the two spoke mounting portions of the hub body and the brake disc;

the driven member has an inner wall provided with a plurality of oneway ratchet teeth;

the drive member extends through and protrudes outwardly from the central hole of the brake disc;

the drive member has a first end provided with a oneway ratchet wheel received in the driven member and meshing with the oneway ratchet teeth of the driven member and a second end provided with a freewheel;

the brake disc is located between the oneway ratchet wheel and the freewheel of the drive member; wherein the central hole of the brake disc is mounted on and surrounds the periphery of the mounting ring of the hub body.

2. The hub assembly in accordance with claim 1, wherein the central hole of the brake disc has a diameter greater than that of the drive member to allow passage of the drive member through the central hole of the brake disc.

3. The hub assembly in accordance with claim 1, wherein the central hole of the brake disc has a diameter greater than that of the freewheel of the drive member to allow passage of the freewheel of the drive member through the central hole of the brake disc.

4. The hub assembly in accordance with claim 3, wherein the oneway ratchet teeth of the drive member extends through and protrudes outwardly from the central hole of the brake disc;

the freewheel of the drive member extends through and protrudes outwardly from the central hole of the brake disc.

5. The hub assembly in accordance with claim 1, wherein the drive member and the brake disc are separated from each other by the mounting ring of the hub body.

6. The hub assembly in accordance with claim 1, wherein the central hole of the brake disc has a diameter greater than that of the mounting ring of the hub body to facilitate mounting of the central hole of the brake disc onto the mounting ring of the hub body.

* * * * *